Oct. 25, 1966  K. T. BUTTERY ETAL  3,281,054
ECONOMY CARTONS FROM MUTUALLY NESTABLE BLANKS
Filed June 16, 1965  6 Sheets-Sheet 3

Inventors
Kenneth T. Buttery
and Norman A. Nuyen
By Gordon W. Huescher
Atty.

3,281,054
ECONOMY CARTONS FROM MUTUALLY NESTABLE BLANKS

Kenneth T. Buttery and Norman A. Nuyen, both of Kalamazoo, Mich., assignors, by mesne assignments, to Brown Company, a corporation of Delaware
Filed June 16, 1965, Ser. No. 464,527
12 Claims. (Cl. 229—51)

The present invention relates to cartons, and is more particularly concerned with cartons which may be readily and inexpensively erected from integral cut and scored mutually nestable blanks, and which cartons may be readily and positively sealed by means of automatic machinery.

Cartons having a so-called "flip top" cover hingedly connected to the edge of the rear panel, which may be erected with the cover in sealed condition and which may be readily opened by the removal of a tear strip, have become exceedingly popular, particularly as containers for food items such as ice cream. Once the tear strip is removed, the cover may be opened for access to some or all of the contents, and may be reclosed for further storage until the contents have been completely consumed. Cartons of the type described which have been available in the prior art, although satisfactory in use, have the disadvantage that they are difficult to construct and seal on automatic machinery.

Prior art cartons are generally provided with an outer front wall member integral with the cover of the carton, having its own flaps extending at the ends thereof. A tear strip is provided as an integral unit and extends from the end of one outer front wall flap, across the outer front wall, and to the end of the opposite outer front wall flap. Such a structure is expensive, difficult to construct into a carton from an integral blank, and requires expensive machinery for the purposes of erection and sealing. Additionally, the structure requires a large amount of paperboard, thus adding to the cost of the materials employed. Moreover, for many purposes it is sufficient for only the cover front wall to be provided with detachable means adhesively affixing the cover to the front wall of the carton. Moreover, even where it is necessary to provide some means for affixing the cover end walls to the end walls of the body of the carton, it is in many cases sufficient to provide means of limited extent for so doing. A further disadvantage of structures of the type described is that when the outer end flaps are brought together for the purpose of closing and sealing the carton, the edges of some of the flaps engage the adhesive of complementary flaps and either become entangled with the adhesive-bearing flaps, or else cause the loss of a substantial amount of the adhesive by rubbing the adhesive off the flaps upon which it has been applied. Sometimes this presents problems of such a serious nature that packaging lines must be temporarily shut down for removal of jammed or disfigured cartons and spilled product.

It is an object of the present invention to provide a carton which may be formed from integral cut and scored mutually nestable blanks. It is a further object to provide a top-opening carton which may be sealed by means of a detachable adhesive strip affixing the cover to the front wall of the carton. It is another object to provide such a carton which may be readily reclosed when it is desired to store unconsumed contents. It is a still further object to provide a carton of the type described which can be readily erected and subsequently sealed by means of relatively simple and inexpensive machinery. It is an additional object to provide a carton having its panels so contoured as to facilitate assembling and heat sealing the various panels to form a strongly sealed carton. The accomplishment of the foregoing and additional objects will become more fully apparent hereinafter.

The invention in its preferred embodiment is illustrated by the accompanying drawings in which.

According to the invention, a carton is provided which is formed from an integral blank having panels including a bottom member having inner end wall flaps hingedly connected to the ends thereof, a front wall member hingedly connected to one edge of the bottom member having front wall outer end flaps hingedly connected to the ends thereof, and a rear wall member hingedly connected to the other edge of the bottom member having rear wall outer end flaps hingedly connected to the ends thereof. A cover is provided which is hingedly connected to the upper edge of the rear wall member. The cover is provided with cover flaps comprising cover end wall panels and a cover front wall panel. The cover front wall panel is provided at its ends with end flaps overlapped by and adhesively affixed to the cover end wall panels. Detachable means, as for example an adhesive strip, or an adhesive strip in combination with a tear strip, is provided at the edge of the cover front wall panel adhesively affixing the cover front wall panel to the front wall member. Additionally, in the preferred embodiment, the cover end wall panels are each provided with a detachable adhesive panel connected thereto at a severance line. The structure of the carton is so designed that adjacent blanks may be reversed for nesting together during the cutting process in order to conserve paperboard raw material. Several features are provided which facilitate such nesting. The rear wall outer end flaps, the cover end wall flaps, and the cover front wall end flaps are designed to be shorter than the front wall outer end flap and the inner end wall flaps. The upper terminal corner of each rear wall outer end flap is provided with a rectangular recess so designed that when adjacent blanks are nested together in oppositet directions with the oblique recessions of the rear wall outer end flaps in edge-to-edge engagement, the edges of the rear upper corner of the inner end wall flap of one blank are nested in edgeto-edge engagement with the edges of the corner recess of the rear wall outer end flap of the other blank. As a result of these structural designs, blanks may be cut from the stock paperboard in reversed nesting arrangement, resulting in a substantial saving in raw material cost. Further, the oblique recess at the lower terminal corners of the rear wall outer end flaps have an additional advantage, in that they permit the forward edge of these flaps to clear the adhesive areas of the front wall outer end flaps when the flaps are folded together, thus avoiding interference with such adhesive areas and attendant difficulties as previously outlined.

Figure 1:
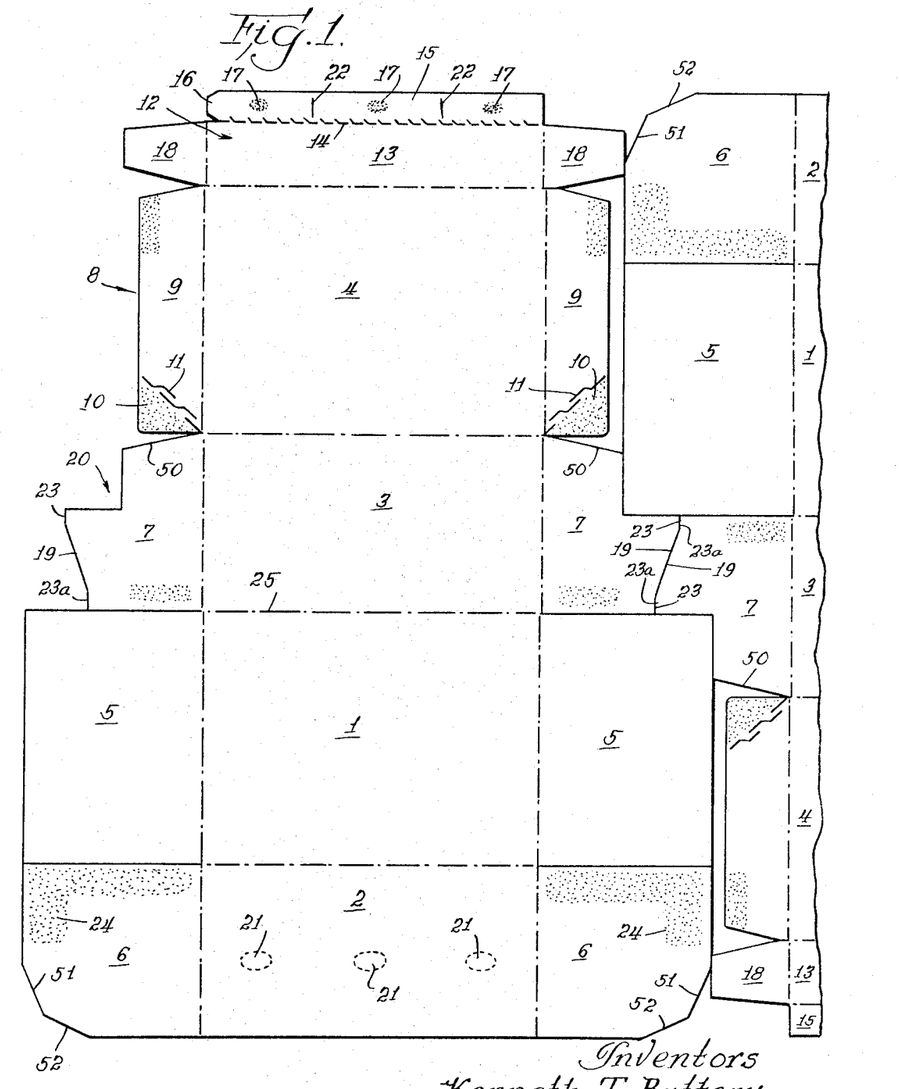
FIG. 1 is a plan view of a blank cut and scored for assembling a carton according to the invention, and additionally showing a portion of the edge of an adjacent blank nesting therewith.

Reference is now made to the accompanying drawings for a better understanding of the invention, wherein all of the parts are numbered, wherein the same numbers are used to refer to corresponding parts throughout, and wherein areas having an adhesive applied thereto are indicated by stippled shading. In a preferred form, the carton of the invention is constructed from an integral blank, as illustrated in FIG. 1, and comprises a bottom panel member 1, a front wall member 2, and a rear wall member 3 hingedly connected to the bottom member 1. A cover 4 is hingedly connected to the rear wall member 3. The bottom 1 is provided at its ends with inner end wall flaps 5 hingedly connected thereto, the front wall member 2 is provided at its ends with front wall outer end flaps 6 hingedly connected thereto, and the rear wall member 3 is provided with rear wall outer end flaps 7 hingedly connected thereto.

The cover 4 is provided with end flaps 8 comprising cover end wall panels 9 having adhesive panels 10 connected to the panels 9 at severance or fracture lines 11. The cover 4 is also provided at its forward edge with a cover flap 12 comprising a cover front wall panel 13, and a severance or fracture line 14 defining a detachable tear strip or adhesive panel 15 having a tab or graspable portion 16 at one end thereof. The adhesive panel 15 is adhesively affixed to the front wall member. Adhesion is accomplished by means of isolated adhesive areas 17 as, for example, in the form of circles, ovals, tear-drops, or rectangles, provided either on the surface of the adhesive panel as shown in FIG. 1, or on the corresponding areas of the front wall member. If desired, a glue resist coating or glue resist ink, or both, may be advantageously applied intermediate the adhesive areas to prevent adhesion at such places when a general application of the adhesive is provided. Intermediate the adhesive areas 17 transverse cuts 22 are provided in the adhesive panel for facilitating the removal of the adhesive panel 15. Cut scores 21 are also provided on the front surface of the front wall member surrounding the areas to which the adhesive areas 17 are to become affixed. The cover front wall panel is provided at its ends with end flaps 18, for being affixed to the cover end wall panels 9. As more fully disclosed in applications Serial Nos. 464,386, 464,514, and 464,525, filed even date herewith, now abandoned, to facilitate use of the carton on rapidly-moving carton filling and closing equipment, it is preferred that the length of the cover front wall panel flaps be greater than the width of the cover end wall panels and, moreover, that the width of the cover front wall panel flaps also be less than the width of the cover end wall panels.

The lower portions of the terminal edges of the rear wall outer end flaps are each provided with an oblique recession 19 receding from the forward-most terminal edge 23 toward the bottom edge of the flap 7 to a vertical edge 23a having the same length as the edge 23. The forward edge 23 should be positioned a sufficient distance from the bottom edge of the flap, or from an imaginary line representing an extension of the score line 25, so that the edge 23 clears the adhesive area 24 when the flaps 6 and 7 are folded together. A rectangular corner recess 20 is also provided in the upper terminal corner of the rear outer end wall flap 7 to facilitate nesting of adjacent blanks when they are cut from the paperboard stock, as shown in FIG. 1. The oblique receding edge 19, which should preferably be straight, has a further function in that it permits the oblique edge 19 of an adjacent blank to nest closely therewith, as shown in FIG. 1, accomplishing a material saving in raw material.

In the broader aspects of the invention, the rectangular recess or cut-out 20 may be omitted, thus increasing the vertical dimension of the forward edge 23 of flap 7 or of the oblique recession 19. Although such embodiment does not have the complete blank nesting ability of the embodiment described and illustrated in the drawings, it still retains the advantages that the front edge 23 of the rear wall outer end flap 7 clears the adhesive area 24 of the front wall outer end flap 6, and that it permits the flap 6 to be directly adhered to the inner end wall 5 over a significant segment of its length.

Figure 2:
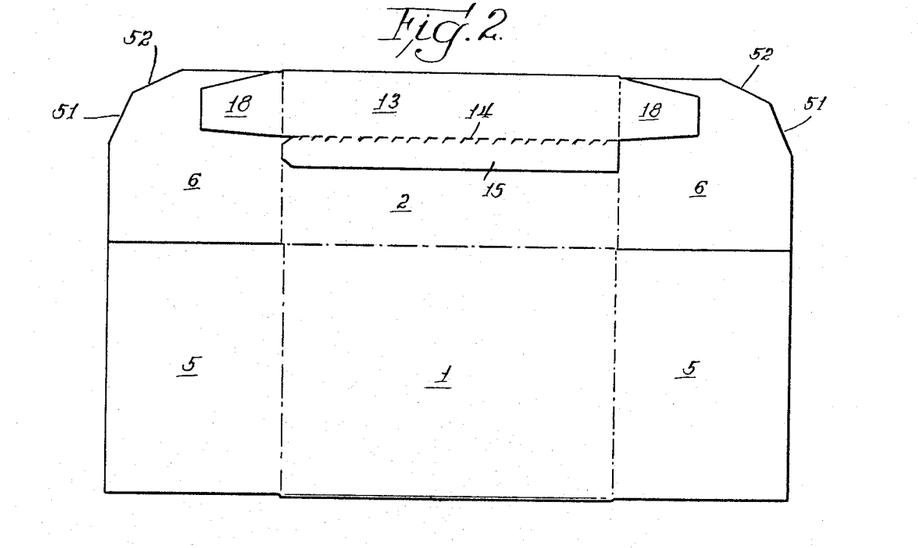
FIG. 2 is a plan view of the blank folded over and glued to form a flattened tube.
Figure 3:
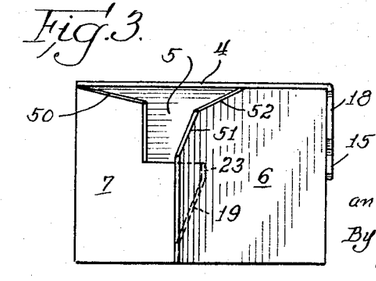
FIG. 3 is an end view of the carton showing the front and rear wall outer end flaps in partially folded position.
Figure 4:
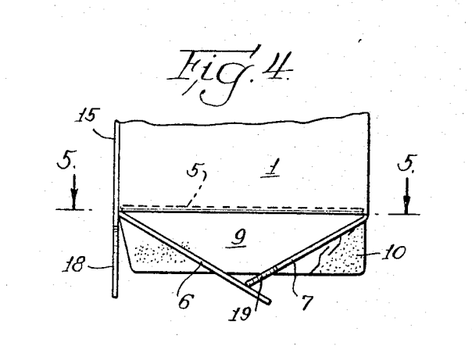
FIG. 4 is a bottom view of the structure of FIG. 3.
Figure 5:
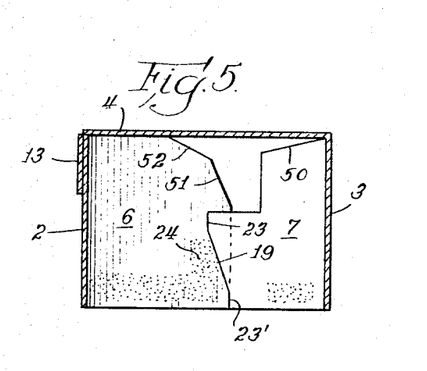
FIG. 5 is a cross-sectional view taken at the line 5—5 of FIG. 4.

In assembling the carton, the carton blank may be folded at the score line between the bottom 1 and rear wall member 3. The cover front wall panel 13 is then folded over and the adhesive panel 15 affixed to the outer surface of the front wall member 2, forming a folded tube, as shown in FIG. 2. Alternatively, the front wall member 2 may be folded over at the score line connecting it with the bottom 1, and the adhesive panel 15 may then be glued to the outer surface of the front wall member 2 in the same manner. In either form the carton so folded occupies very little space, and may be shipped to the packager in this form for filling and sealing.

Figure 6:
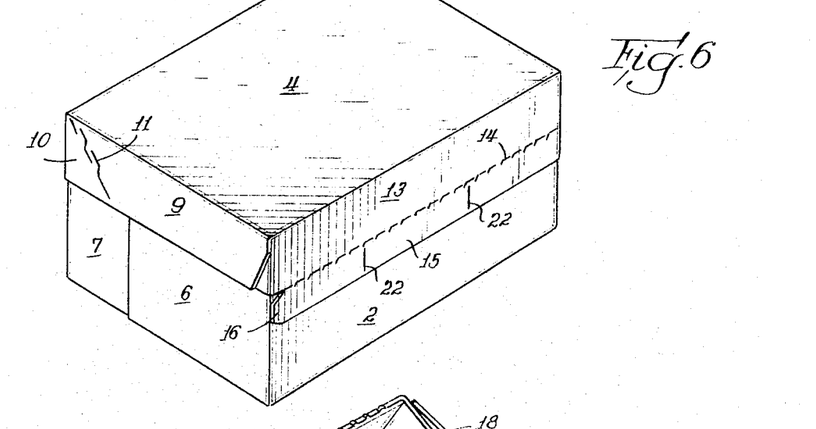
FIG. 6 is a perspective view of the sealed carton.

To erect the carton further for filling, the folded carton is squared up, as on a conventional squaring machine. One end is the closed by first folding in the inner end wall flap 5. The rear wall outer end flap 7 and the front wall outer end flap 6 are then folded in, the front front wall outer end flap overlapping the rear wall outer end flap. The contour provided by the recessed edge 19 permits the terminal edge 23 of the rear wall outer end flap 7 to clear the adhesive area 24 on the inner surface of the outer wall end flap 6. The cover front wall panel end flap 18 is then folded over, followed finally by the folding over of the cover end wall panel 9. The greater length of the flap 18 permits it to be engaged and folded over by the plow of the folding apparatus before the panel 9 (of lesser width) is engaged. Heat is then applied to activate and set the adhesive, causing the front wall outer end flap 6 to become adhesively affixed to the rear wall outer end flap 7 and also to the inner end wall flap 5. The adhesive panel 10 becomes adhesively affixed to the rear wall outer end flap 7 and cover front wall panel end flap 18 becomes affixed to cover end wall panel 9. The carton may then be filled through the end remaining open. The opened end may subsequently be closed and sealed in the same manner, to form a completely sealed carton as shown in FIG. 6. Alternatively, the first carton end may be closed and/or tacked, as with glue, but not sealed, and then both carton ends sealed concurrently or simultaneously after filling of the carton.

Figure 7:
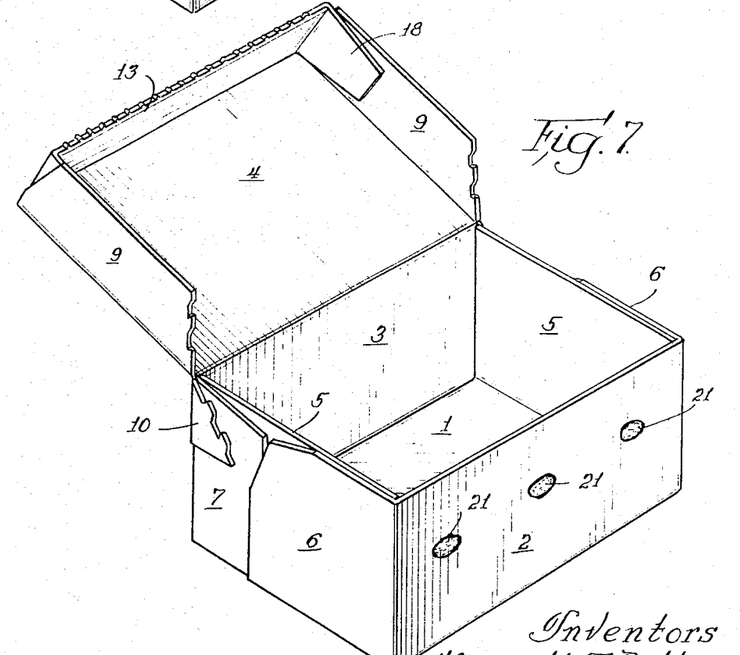
FIG. 7 is a perspective view of the carton of FIG. 6 after the seal has been broken and the cover opened.
Figure 8:
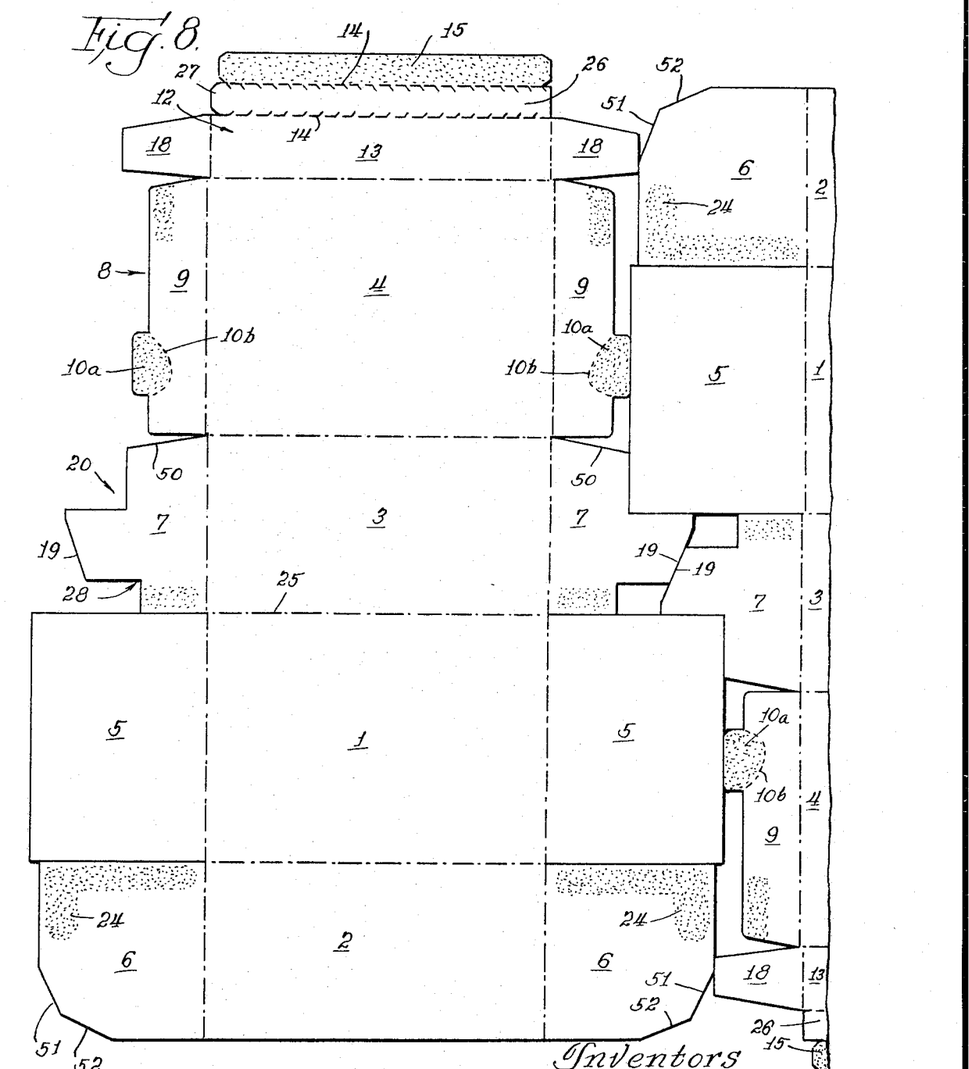
FIG. 8 is a plan view of a blank cut and scored for assembling an alternative embodiment of the invention, also showing a portion of the edge of another blank nested therewith.
Figure 9:
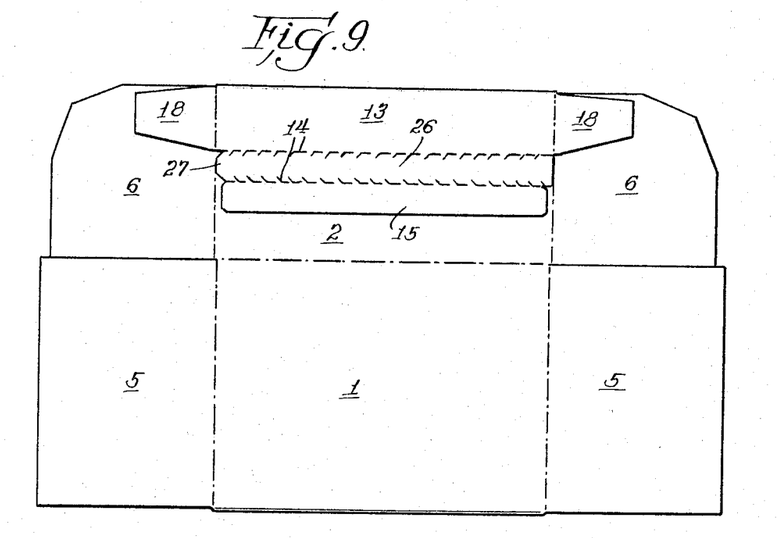
FIG. 9 is a plan view of the blank of FIG. 8 folded over and glued to form a flattened tube.
Figure 10:
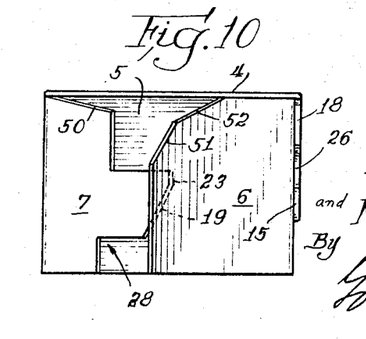
FIG. 10 is an end view of the partially erected carton showing the outer end wall flaps in partially closed position.
Figure 11:
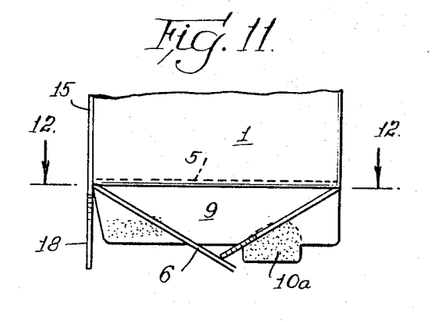
FIG. 11 is a bottom view of the structure shown in FIG. 10.
Figure 12:
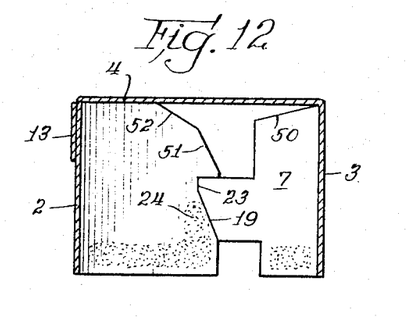
FIG. 12 is a vertical cross-sectional view taken at the line 12—12 of FIG. 11.
Figures 13, 14:
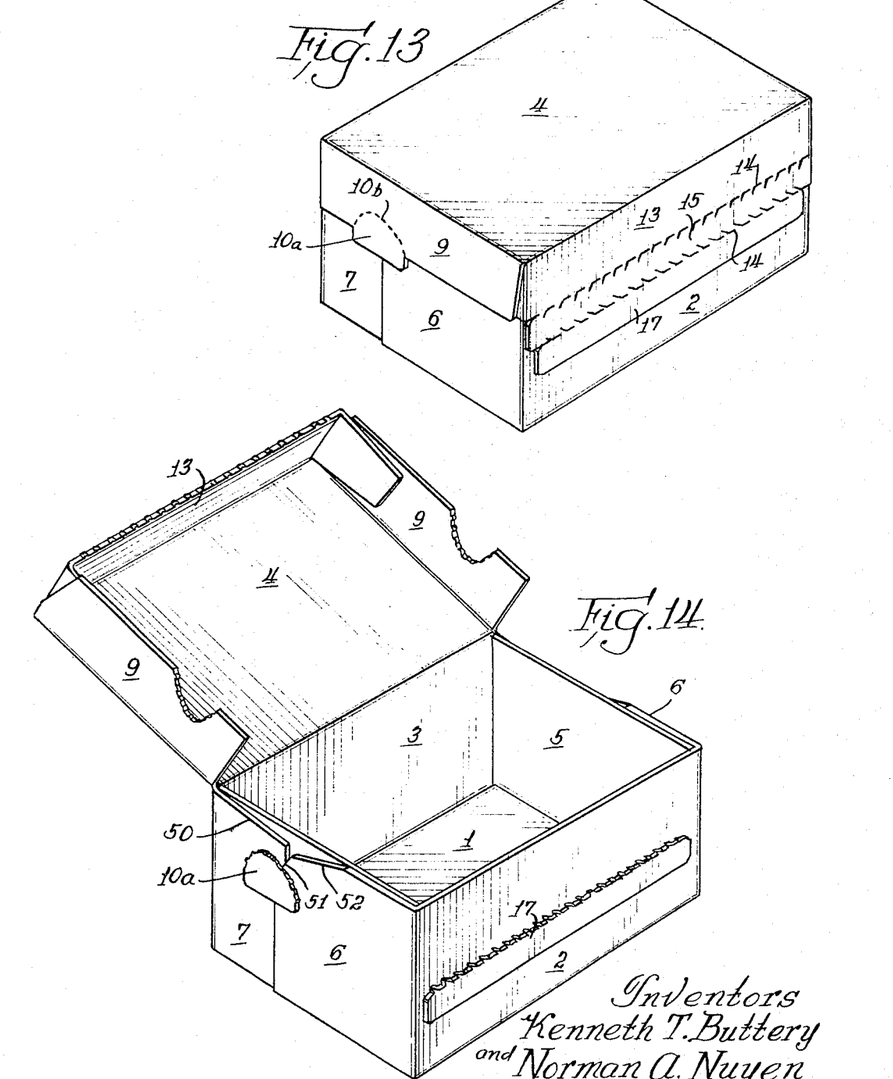
FIG. 13 is a perspective view of the sealed carton prepared from the blank of FIG. 8.
FIG. 14 is a perspective view of the carton of FIG. 13 after the seal has been broken and the cover opened.

The carton may be opened by grasping the tab 16 and removing the adhesive panel 15. The cut scores 21 prevent tearing of the outer surface of the front wall member outside of the areas defined by the cut scores 21. As the cover is subsequently lifted open, the cover end wall panels 9 are parted from the adhesive panels 10 at the severance lines 11, forming the structure shown in FIG. 7. The cover may be reclosed for storing any unconsumed contents.

In the preferred version of the embodiment shown in FIGS. 1–7, the entire area of the front wall member (excluding glue areas to which the adhesive panel or strip is to be sealed is coated with a solid coating of a glue-repellent ink, preferably one having microcrystalline wax incorporated therein. In order to provide optimum results, the printing must be solid color and not printing formed by means of a dot pattern. The entire outer surface of the carton is pattern-coated with a release agent such as a wax coating, excluding the circular, oval, "tear-drop," or other areas defined by the cut scores 21, which areas are to be glued to the adhesive strip. The inner surface of the entire carton is also coated with a release coating such as wax, excluding the areas on the adhesive strip which subsequently are to be placed in register with the glue areas of the front wall member defined by the cut scores 21. A conventional glue composition is then applied as a solid coating over the inner surface of the adhesive strip 15. Consequently, when the adhesive panel or strip 15 is folded over onto the front wall member 2, it becomes adhered to the front wall member only at the tear-drop areas defined by the cut score lines 21, which areas are substantially free of any release agent such as wax. In the preferred embodiment, the transverse cuts 22 are positioned immediately rearward of each adhesive area 17 with respect to the direction of tear. Consequently, when the adhesive panel 15 is grasped at the tab 16 and removed, it parts cleanly from the front wall member, except in the adhesive zones surrounded by the cut score lines 21, within which zones only the top liner is removed in the tearing process.

Although either the wax coating or the glue repellent ink may be used separately as a release agent to prevent adhesion between the adhesive panel 15 and the front wall member 2, optimum results are obtained by the use of the combination of both. Moreover, although rectangular areas may be provided free from the release agent at the adhesive zones, optimum results are obtained when the printed application of the release coating is closely patterned around the tear drop areas, substantially exactly in register with the areas of the tear drop. The conventional adhesive, such as glue, is laid down as a solid strip on the front wall member from one end of the adhesive strip to the other. Other types of adhesive may be used if desired. Although in the preferred embodiment the adhesive is placed on the panel 15, it may if desired be applied to the front wall members 2. The transverse cuts 22 serve to prevent splitting of the stock as the adhesive strip "zipper" is pulled off. However, they may be dispensed with in certain applications.

Although a preferred form of adhesive panel or strip has been described and illustrated in FIGS. 1–7, other forms, generally more simplified, may also be utilized. For example the entire panel or strip 15 may be adhered to the front wall member 2. The cover may then be separated from the adhesive panel by tearing the severance line by means of a knife, or merely by running a fingernail along the severance line while pressing inwardly. Other forms of adhesive panels known to the art having a structure wherein they are separated from the cover front wall panel by at least one severance line may also be used.

A modified embodiment of the invention is shown in FIGS. 8–14. The basic structure of this embodiment is the same as that shown in FIGS. 1–7. However, in this embodiment the adhesive panel 15 is connected to the cover front wall panel 13 by means of a detachable tear strip 26 having a tab 27. The rear wall outer end flaps 7 are provided with substantially rectangular lower terminal corner recesses 28 through which the lower margin of the front wall outer end flap 6 may be adhesively affixed to the inner end wall flap 5. Additionally, adhesive panels 10a connected to the cover end wall panels at severance lines 10b are so positioned that, when the carton is assembled, they are adhesively affixed to both the front wall and rear wall outer end panels at the upper edges where the two flaps are in edge-to-edge engagement, resulting in an improvement in structural strength. Although as shown the adhesive panels extend below the edges of the cover end wall panels, they may if so desired, be designed so that their edge is colinear with the panel edges or receding therefrom.

The carton is assembled and sealed in substantially the same manner as described above. The sealed carton may be opened by grasping the tab 27 and completely removing the tear strip 26. As the cover is lifted open, the adhesive panels 10a are detached and permit the cover to be fully opened.

The carton of the invention has an important advantage over prior art cartons in that successive blanks may be positioned and cut in closely nested position, effecting a substantial saving in material costs. Additionally, the terminal edges of the rear wall outer end flaps are so contoured that they do not interfere with the adhesive contained upon the inner surface of the front wall outer end flaps, facilitating the assembly of the carton. Further, the increased length of the cover front wall panel flaps with respect to the width of the cover end wall panels facilitates their being properly folded under the cover end wall panels using inexpensive machinery or adaptations thereof.

It is thus seen that an economical and conveniently erected and sealed carton of sufficient durability for frequent opening and reclosing is produced, having particularly advantageously designed rear wall outer end flaps, which carton is produced from an integral blank so designed that adjacent blanks may be oriented for close mutual nesting to provide an appreciable saving in cost of raw material, and whereby all of the other objectives of the invention are attained.

Although the invention has been described primarily as it would be practiced when a heat-sealable adhesive is carried directly on the carton blank, other types and forms of adhesive and other means of applying the adhesive to effect sealing of the carton may be employed.

Plastic (such as polyethylene) coated or wax coated paperboard, or laminated paperboard with openings for extrusion sealing, may also be employed for the cartons and carton blanks according to the invention.

The outer end flap tapers 50, 51 and 52, where shown in the drawings, are not essential for either operativeness or completeness of the carton structure. However, it has been found that taper 50 at the upper terminal edge of the rear wall outer end flap and taper 52 at the upper terminal edge of the front wall outer end flap are extremely convenient modifications which have the result of eliminating binding of the carton on the ways of the cartoning machinery with the extended inner flap 50 of the proceding carton in the machine. This allows greater speed of packaging without undesirable time-delays.

Moreover, because of the recess 20 in rear wall outer end flaps 7, there is a tendency for the upper terminal edge of the rear wall outer end flap 7 to bind with the upper terminal edge of the front wall outer end flap 6 during closing of the front wall outer end flap 6 upon the rear wall outer end flap 7. This tendency to bind is eliminated by provision of taper 51 at the upper terminal edge of front wall outer end flaps 6, which may be present alone or together with taper 52, in such latter case providing a double taper to the upper terminal edge of the front wall outer end flap 6 in the preferred embodiment of this structural modification. When all of the tapers are present, and especially taper 51, as previously described, the rate of closing and sealing of the cartons of this invention on rapidly moving equipment can approximate 2,000 per minute or greater, almost double the number which can be conveniently handled without any of the said tapers. In addition, the tapers 50 and 52 serve the further function of maintaining the outer end flaps 6 and 7 in better alignment upon sealing, since closure of the cover end flaps upon the front and rear wall outer end flaps 6 and 7 when tapers 50 and 52 are present does not tend to push the end flaps out of proper alignment thereby causing the ultimate sealing to be less satisfactory than desired.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. A carton formed of an integral blank cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adhesively affixing said cover front wall panel to said front wall member, said front wall outer end flaps having an adhesive applied to the lower portion of the inner surface thereof and the terminal edge of each of said rear wall outer end flaps having an oblique recession directed downwardly and rearwardly and being so arranged that the terminal edges of said rear wall outer end flaps clear the adhesive on said front outer end flaps when said flaps are folded over with said front wall outer end flaps overlapping said rear wall outer end flaps.

2. A carton formed of an integral blank cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adhesively affixing said cover front wall panel to said front wall member, the terminal edge of each of said rear wall outer end flaps having an oblique recession directed downwardly and rearwardly and being so arranged that the terminal edges of said rear wall outer end flaps first engage said front wall outer end flaps when said flaps are folded over with said front wall outer end flaps overlapping said rear wall outer end flaps, the upper terminal corner of each rear wall outer end flap being provided with a recess so designed that when adjacent blanks from which said carton is formed are nested together in opposite directions with the oblique recessions of said rear wall outer end flaps in substantially edge-to-edge engagement, the edges of the rear upper corner of the inner end wall flap of one blank are nested in edge-to-edge engagement with the edges of the corner recess of the rear wall outer end flap to the other blank.

3. A carton formed of an integral blank cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adhesively affixing said cover front wall panel to said front wall member, said front wall outer end flaps having an adhesive applied to the lower portion of the inner surface thereof and the terminal edge of each of said rear wall outer end flaps having an oblique recession directed downwardly and rearwardly and being so arranged that the terminal edges of said rear wall outer end flaps clear the adhesive on said front wall outer end flaps when said flaps are folded over with said front wall outer end flaps overlapping said rear wall outer end flaps, the upper terminal corner of each rear wall outer end flap being provided with a recess so designed that when adjacent blanks from which said carton is formed are nested together in opposite directions with the oblique recessions of said rear wall outer end flaps in edge-to-edge engagement, the edges of the rear upper corner of the inner end wall flap of one blank are nested in edge-to-edge engagement with the edges of the corner recess of the rear wall outer end flap of the other blank, the lower terminal corners of said rear wall outer end flaps being provided with recesses, and the lower terminal corner of said front wall outer end flaps being adhesively affixed to said inner wall end flap through said recesses.

4. A carton formed of an integral blank cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, each of said cover end wall panels being provided with an adhesive panel detachably connected thereto and being adhesively affixed to at least one of said outer end wall panels, and detachable means adhesively affixing said cover front wall panel to said front wall member, said front wall outer end flaps having an adhesive applied to the lower portion of the inner surface thereof and the terminal edge of each of said rear wall outer end flaps having an oblique recession directed downwardly and rearwardly and being so arranged that the terminal edges of said rear wall outer end flaps clear the adhesive on said front wall outer end flaps when said flaps are folded over with said front wall outer end flaps overlapping said rear wall outer end flaps, the upper terminal corner of each rear wall outer end flap being provided with a substantially rectangular recess so designed that when adjacent blanks from which said carton is formed are nested together in opposite directions with the oblique recessions of said rear wall outer end flaps in edge-to-edge engagement, the edges of the rear upper corner of the inner end wall flap of one blank are nested in edge-to-edge engagement with the edges of the corner recess of the rear wall outer end flap of the other blank.

5. A carton formed of an integral blank cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adhesively affixing said cover front wall panel to said front wall member comprising an adhesive strip adhesively affixed to said front wall member and being detachably connected to the edge of said cover front wall panel by means of at least one severance line, generally parallel to said edge, said front wall outer end flaps having an adhesive applied to the lower portion of the inner surface thereof and the terminal edge of each of said rear wall outer end flaps having an oblique recession directed downwardly and rearwardly and being so arranged that the terminal edges of said rear wall outer end flaps clear the adhesive on said front wall outer end flaps when said flaps are folded over with said front wall outer end flaps overlapping said rear wall outer end flaps.

6. An integral blank for forming a carton cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adapted for adhesively affixing said cover front wall panel to said front wall member, said front wall outer end flaps having adhesive applied to the portion of the inner surface thereof which will be the lower portion upon erection of a carton from said blank and the termnial edge of each of said rear wall outer end flaps having an oblique recession which will be directed downwardly and rearwardly upon erection of a carton from said blank and being so arranged that the terminal edges of said rear wall outer end flaps clear the adhesive on said front wall outer end flaps when said flaps are folded over with said front wall outer end flaps overlapping said rear wall outer end flaps.

7. An integral blank for forming a carton cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adapted for adhesively affixing said cover front wall panel to said front wall member, the terminal edge of each of said rear wall outer end flaps having an oblique recession which will be directed downwardly and rearwardly upon erection of a carton from said blank and being so arranged that the terminal edges of said rear wall outer end flaps are first to engage said front wall outer end flaps when said flaps are folded over with said front wall outer end flaps overlapping said rear wall outer end flaps, the upper terminal corner of each rear wall outer end flap being provided with a recess so designed that when adjacent blanks are nested together in opposite directions with the oblique recessions of said rear wall outer end flaps in substantially edge-to-edge engagement, the edges of the rear upper corner of the inner end wall flap of one blank are nested in edge-to-edge engagement with the edges of the corner recess of the rear wall outer end flap of the other blank.

8. An integral blank for forming a carton cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adapted for adhesively affixing said cover front wall panel to said front wall member, said front wall outer end flaps having an adhesive applied to the portion of the inner surface thereof which will be the lower portion upon erection of a carton from said blank and the terminal edge of each of said rear wall outer end flaps having an oblique recession which will be directed downwardly and rearwardly upon erection of a carton from said blank and being so arranged that the terminal edges of said rear wall outer end flaps clear the adhesive on said front wall outer end flaps when said flaps are folded over with said front wall outer end flaps overlapping said rear wall outer end flaps, the upper terminal corner of each rear wall outer end flap being provided with a recess so designed that when adjacent blanks are nested together in opposite directions with the oblique recessions of said rear wall outer end flaps in edge-to-edge engagement, the edges of the rear upper corner of the inner end wall flap of one blank are nested in edge-to-edge engagement with the edges of the corner recess of the rear wall outer end flap of the other blank, the lower terminal corners of said rear wall outer end flaps being provided with recesses, and the lower terminal corner of said front wall outer end flaps being adapted to be adhesively affixed to said inner wall end flap through said recesses.

9. An integral blank for forming a carton cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, each of said cover end wall panels being provided with an adhesive panel detachably connected thereto and adapted for being adhesively affixed to at least one of said outer end wall panels, and detachable means adapted for adhesively affixing said cover front wall panel to said front wall member, said front wall outer end flaps having an adhesive applied to the portion of the inner surface thereof which will be the lower portion upon erection of a carton from said blank and the terminal edge of each of said rear wall outer end flaps having an oblique recession which will be directed downwardly and rearwardly upon erection of a carton from said blank and being so arranged that the terminal edges of said rear wall outer end flaps clear the adhesive on said front wall outer end flaps when said flaps are folded over with said front wall outer end flaps overlapping said rear wall outer end flaps, the upper terminal corner of each rear wall outer end flap being provided with a rectangular recess so designed that when adjacent blanks are nested together in opposite directions with the oblique recessions of said rear wall outer end flaps in edge-to-edge engagement, the edges of the rear upper corner of the inner end wall flap of one blank are nested in edge-to-edge engagement with the edges of the corner recess of the rear wall outer end flap of the other blank.

10. An integral blank for forming a carton cut and scored to provide a bottom member having inner end wall flaps hingedly connected to the ends thereof, a front wall member hingedly connected to one edge of said bottom member having front wall outer end flaps hingedly connected to the ends thereof, and a rear wall member hingedly connected to the other edge of said bottom having rear wall outer end flaps hingedly connected to the ends thereof, a cover hingedly connected to the upper edge of said rear wall member provided with cover flaps comprising cover end wall panels and a cover front wall panel, and detachable means adapted for adhesively affixing said cover front wall panel to said front wall member comprising an adhesive strip adapted to be adhesively affixed to said front wall member and to be detachably connected to the edge of said cover front wall panel by means of at least one severance line, generally parallel to said edge, said front wall outer end flaps having an adhesive applied to the portion of the inner surface thereof which will be the lower portion upon erection of a carton from said blank and the terminal edge of each of said rear wall outer end flaps having an oblique recession which will be directed downwardly and rearwardly upon erection of a carton from said blank and being so arranged that the terminal edges of said rear wall outer end flaps clear the adhesive on said front wall outer end flaps when said flaps are folded over with said front wall outer end flaps overlapping said rear wall outer end flaps.

11. A carton blank of claim 6 wherein the length of the cover front wall panel flaps is greater than the width of the cover end wall panels and the width of the cover front wall panel flaps is less than the width of the cover end wall panels.

12. A carton of claim 1 wherein the length of the cover front wall panel flaps is greater than the width of the cover end wall panels and wherein the cover front wall panel flaps are overlapped by and secured to said cover end wall panels.

References Cited by the Examiner

UNITED STATES PATENTS

| | | | |
|---|---|---|---|
| Re. 25,876 | 10/1965 | Buttery et al. | 229—51 |
| 1,963,639 | 6/1934 | Ahlquist | 229—80 |
| 2,330,666 | 9/1943 | Berkowitz | 229—85 |
| 3,040,957 | 6/1962 | Meyers | 229—37 |
| 3,125,280 | 3/1964 | Henry | 229—51 |
| 3,144,980 | 8/1964 | Larson | 229—51 |
| 3,146,936 | 9/1964 | Hodapp | 229—51 |
| 3,197,114 | 7/1965 | Holmes | 229—51 |

JOSEPH R. LECLAIR, *Primary Examiner.*